United States Patent [19]

Terashima et al.

[11] Patent Number: 4,826,621
[45] Date of Patent: May 2, 1989

[54] FERROELECTRIC LIQUID CRYSTAL COMPOSITION

[75] Inventors: Kanetsugu Terashima; Mitsuyoshi Ichihashi, both of Ichiharashi; Makoto Kikuchi, Kisarazushi; Fusayuki Takeshita, Ichiharashi; Kenji Furukawa, Yokosukashi, all of Japan

[73] Assignee: Chisso Corporation, Osaka, Japan

[21] Appl. No.: 204,252

[22] Filed: Jun. 9, 1988

[30] Foreign Application Priority Data

Jul. 8, 1987 [JP] Japan ................. 62-170562

[51] Int. Cl.$^4$ .................. C09K 19/34; G02F 1/13
[52] U.S. Cl. .................. 252/299.61; 252/299.01; 252/299.65
[58] Field of Search ........... 252/299.01, 299.6, 299.63, 252/299.61, 299.65; 350/350 S

[56] References Cited

U.S. PATENT DOCUMENTS

| | | | |
|---|---|---|---|
| 4,533,488 | 8/1985 | Fukui et al. | 252/299.61 |
| 4,737,313 | 4/1988 | Saito et al. | 252/299.65 |
| 4,752,413 | 6/1988 | Inoue et al. | 252/299.61 |
| 4,765,924 | 8/1988 | Inoue et al. | 252/299.61 |
| 4,769,176 | 9/1988 | Bradshaw et al. | 252/299.65 |
| 4,780,241 | 10/1988 | Furukawa et al. | 252/299.63 |
| 4,780,242 | 10/1988 | Miyazawa et al. | 252/299.65 |
| 4,781,857 | 11/1988 | Inoue et al. | 252/299.61 |

FOREIGN PATENT DOCUMENTS

| | | | |
|---|---|---|---|
| 206228 | 12/1986 | European Pat. Off. | 252/299.61 |
| 3515374 | 11/1986 | Fed. Rep. of Germany | 252/299.61 |
| 3515373 | 11/1986 | Fed. Rep. of Germany | 252/299.61 |
| 62-209190 | 9/1987 | Japan | 252/299.61 |

*Primary Examiner*—Teddy S. Gron
*Attorney, Agent, or Firm*—Fred Philpitt

[57] ABSTRACT

A ferroelectric liquid crystal composition comprising smectic liquid crystal compound(s) and optically active compound(s) and having high-speed response properties and a light switching element containing the same are provided, which composition comprises the following three liquid crystal components A, B and C, the respective proportions thereof being 10 to 70%, 10 to 50% and 10 to 40% each by weight based on the total weight of these components, respectively:

liquid crystal component A:
at least one compound selected from compounds of the formula

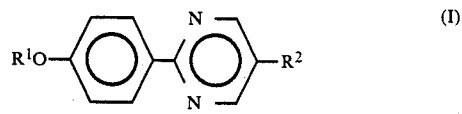

(I)

wherein $R^1$ and $R^2$ each are 1-18C alkyl, and compounds of the formula

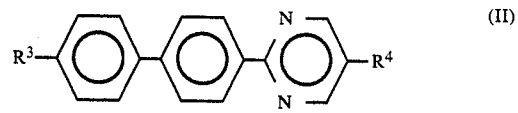

(II)

wherein $R^3$ and $R^4$ each are 1-18C alkyl or alkoxy;
liquid crystal compound B:
at least one compound of the formula

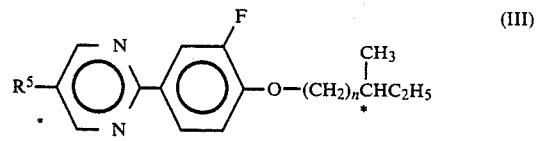

(III)

wherein $R^5$ is a 1-18C alkyl, n is an integer of 0 to 10 and * indicates asymmetric carbon; and
liquid crystal component C:
at least one compound selected from compounds of the formula (Abstract continued on next page.)

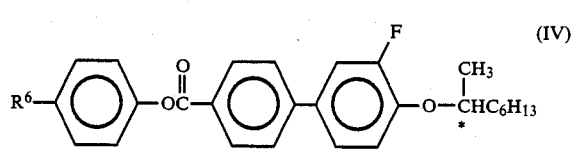
(IV)
wherein $R^6$ is 1-18C alkyl or alkoxy and * is as defined above; and compounds of the formula
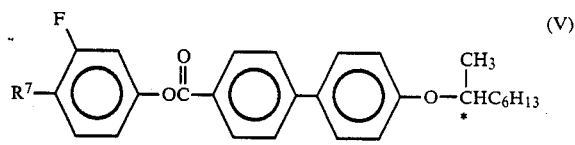
(V)
wherein $R^7$ is 1-18 alkyl or alkoxy and * is as defined above.
2 Claims, 3 Drawing Sheets

FIG. I
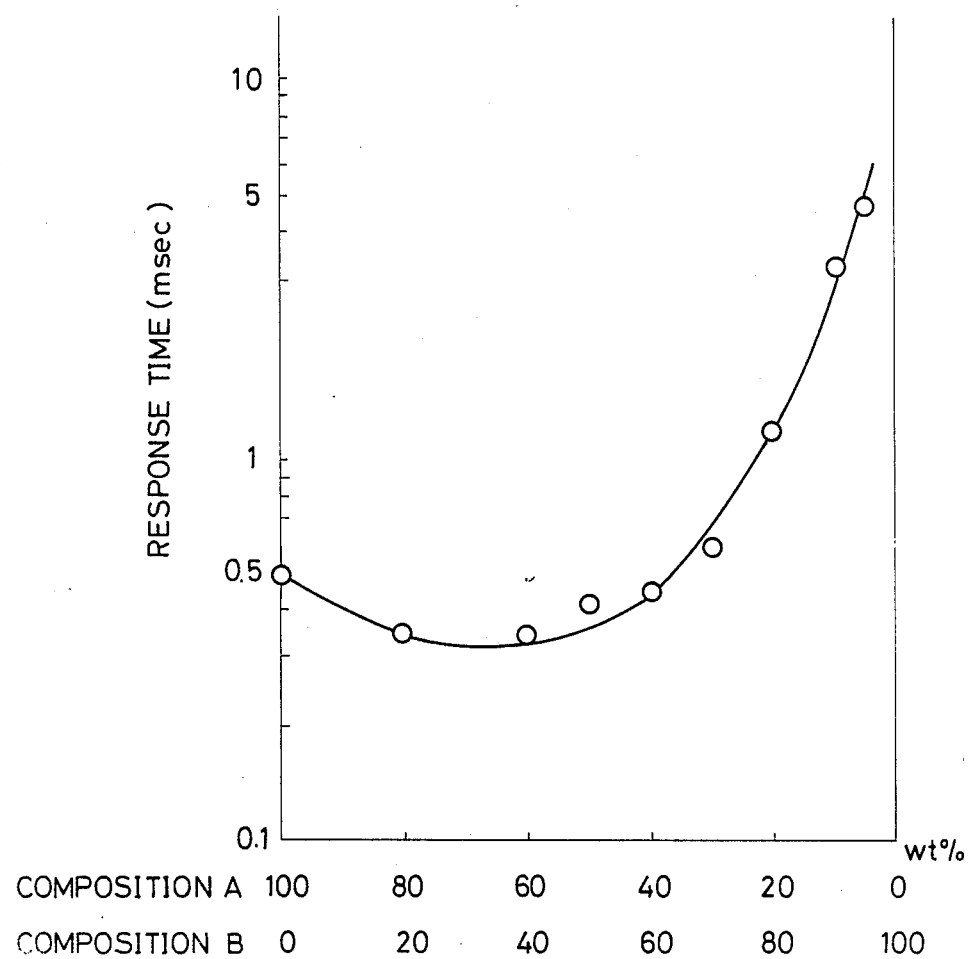

FERROELECTRIC LIQUID CRYSTAL COMPOSITION

BACKGROUND OF THE INVENTION

1. Field of the Invention

This invention relates to a ferroelectric liquid crystal material. More particularly it relates to a ferroelectric liquid crystal composition comprising smectic liquid crystal compound(s) and optically active compound(s) and having high-speed response properties and a light switching element using the same.

2. Description of the Related Art

Liquid crystal compounds have been broadly used as a material for liquid crystal elements, but most of such liquid crystal display elements are of TN display mode, and as liquid crystal materials, those belonging to nematic phase have been used.

Since TN display mode is non-emissive, it has specific features that eyes are not tired and power consumption is small, but on the other hand, it has drawbacks that the response is slow and the display is not seen depending on the angle of view. Thus, the mode has recently been being turned toward a direction of making the best use of its characteristics as flat display, and in particular, high-speed response properties and a broad angle of view have been required.

Various improvements in liquid crystal materials in response to such requirements have been attempted. However, as compared with other emissive displays such as electroluminescence display, plasma display, etc., TN display mode is considerably inferior in the aspect of the response time and the breadth of angle of view.

In order to make the best use of the specific features of liquid crystal display elements such as non-emissive mode and low power consumption and also secure response properties matching emissive display, development of a novel liquid crystal display mode in place of TN display mode has been indispensable. As one of such attempts, a display mode utilizing the light switching phenomenon of ferroelectric liquid crystals has been proposed by N. A. Clark et al (see Appl. Phys. Lett., vol. 36, p. 899 (1980)).

The presence of ferroelectric liquid crystals has been announced by R. B. Meyer et al for the first time (see J. Phys. vol. 36, p. 69 (1975)), and the phases of the crystals include chiral smectic C phase, chiral smectic I phase, chiral smectic F phase, chiral smectic G phase and chiral smectic H phase (hereinafter abbreviated to $S_C^*$ phase, $S_I^*$ phase, $S_F^*$ phase, $S_G^*$ phase and $S_H^*$ phase, respectively in the aspect of liquid crystal structure.

Various specific features are required for ferroelectric liquid crystal materials used for practically usable ferroelectric liquid crystal display elements, but at present, there is no single compound which satisfies all the specific features; hence it is necessary to use ferroelectric liquid crystal compositions obtained by mixing some liquid crystal compounds or liquid crystal compounds with non-liquid-crystal compounds.

Further, the ferroelectric liquid crystal compositions are not limited to those consisting only of ferroelectric liquid crystal compounds, but it has been reported that using compound(s) or composition(s) each exhibiting achiral smectic C, F, G, H, I phase or the like phase (hereinafter abbreviated to Sc phase or the like) as base substance(s), at least one compound exhibiting ferroelectric liquid crystal phases is mixed with the above compound(s) or composition(s) to constitute a ferroelectric liquid crystal composition as a whole (see Japanese patent application laid-open No. Sho 61-195187/1986). Further, it has also been reported that using compound(s) or composition(s) each exhibiting $S_c$ phase or the like as base substance(s), at least one compound which is optically active but exhibits no ferroelectric liquid crystal phase is mixed with the above compound(s) or composition(s) to constitute a ferroelectric liquid crystal composition as a whole (see Mol. Cryst. Liq. Cryst., 89, 327 (1982)).

In a brief summary of these facts, it is seen that when at least one optically active compound, irrespective of whether or not the compound exhibits ferroelectric liquid crystal phase, is mixed with a base compound, it is possible to constitute a ferroelectric liquid crystal composition.

A smectic liquid crystal mixture comprising the above-mentioned base substance exhibiting at least one of achiral $S_c$ phase or the like and having at least one of $S_c$ phase or the like will hereinafter referred to as "smectic base mixture".

As such smectic base mixture, liquid crystal mixtures exhibiting $S_c$ phase within a broad temperature range including room temperature are practically preferred. As a component of the smectic base mixture, some compounds selected from among liquid crystal compounds of e.g. phenylbenzols, Schiff's bases, phenylpyrimidines, 5-alkyl-2-(4-alkoxyphenyl)pyrimidines, etc. have been used.

For example, Japanese patent application laid-open No. Sho 61-291679/1986 and PCT International publication No. WO 86/06401 disclose a ferroelectric liquid crystal obtained by mixing a 5-alkyl-2-(4-alkoxyphenyl)pyrimidine with an optically active compound, and the former publication discloses that use of a ferroelectric smectic liquid crystal material using the above pyrimidine derivative as a smectic base mixture makes it possible to shorten the response time of light switching elements. Further, the above former publication also discloses that a ferroelectric liquid crystal material consisting of a 5-alkyl-2-(4'-alkylbiphenylyl-4)pyrimidine, the above 5-alkyl-2-(4-alkyloxyphenyl)pyrimidine and an optically active compound is also effective for improving response properties.

However, as compared with liquid crystal displays of other modes such as emissive display, a further improvement in the response properties has been desired for the above liquid crystal display.

On the other hand, one more problem desired to solve, together with the improvement in the response properties is to reduce the temperature-dependency of the response time. Current ferroelectric liquid crystal materials have a large temperature-dependency of the response time so that a cross talk phenomenon often occurs due to environmental temperature change to notably reduce the display quality of the display.

Thus, a ferroelectric liquid crystal material having a small temperature-dependency of the response time together with high-speed response properties has been earnestly desired.

SUMMARY OF THE INVENTION

As apparent from the foregoing, a first object of the present invention is to provide a ferroelectric liquid crystal composition having high-speed response properties and also a small temperature-dependency of the response time, and a second object thereof is to provide a light-switching element using the above liquid crystal composition and having high-speed response properties.

The present inventors have made extensive research in order to further improve the invention disclosed in the above Japanese patent application laid-open No. Sho 61-291679/1986. As a result, we have found that when liquid crystal compounds are combined together as shown below, a ferroelectric liquid crystal composition having high-speed response properties and also a small temperature-dependency of the response time is obtained, and have completed the present invention.

The present invention in the first aspect resides in (1) a ferroelectric liquid crystal composition comprising the following three liquid crystal components A, B and C, the respective proportions of the components A, B and C being 10 to 70% by weight, 10 to 50% by weight and 10 to 40% by weight based on the total weight of these components, respectively:

liquid crystal component A:
at least one compound selected from compounds expressed by the formula

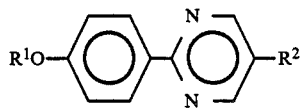

wherein $R^1$ and $R^2$ represent the same or different alkyl group of 1 to 18 carbon atoms and compounds expressed by the formula

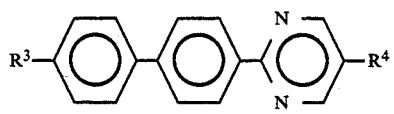

wherein $R^3$ and $R_4$ represent the same or different alkyl group or alkoxy group each of 1 to 18 carbon atoms;

liquid crystal component B:
at least one compound selected from compounds expressed by the formula

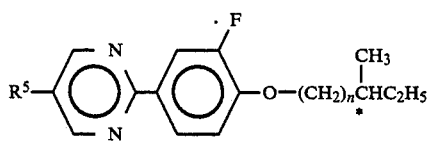

wherein $R^5$ represents an alkyl group of 1 to 18 carbon atoms; n represents an integer of 0 to 10; and * indicates an asymmetric carbon atom; and liquid crystal component C:
at least one compound selected from compounds expressed by the formula

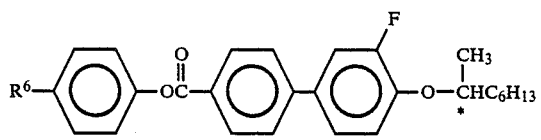

wherein $R^6$ represents an alkyl group or an alkoxy group each of 1 to 18 carbon atoms and * indicates an asymmetric carbon atom and compounds expressed by the formula

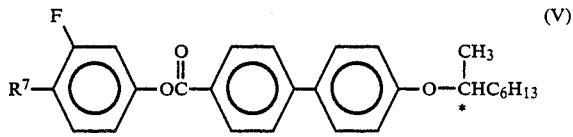

wherein $R^7$ represents an alkyl group or an alkoxy group each of 1 to 18 carbon atoms and * indicates an asymmetric carbon atom.

The present invention in the second aspect resides in a light switching element containing a ferroelectric liquid crystal composition comprising the following three liquid crystal components A, B and C, the respective proportions of the components A, B and C being 10 to 70% by weight, 10 to 50% by weight and 10 to 40% by weight based on the total weight of these components, respectively:

liquid crystal component A:
at least one compound selected from compounds expressed by the formula

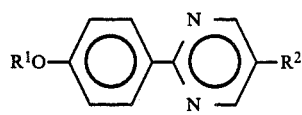

wherein $R^1$ and $R^2$ represent the same or different alkyl group of 1 to 18 carbon atoms and compounds expressed by the formula

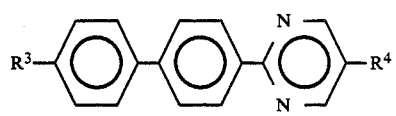

wherein $R^3$ and $R^4$ represent the same or different alkyl group or alkoxy group each of 1 to 18 carbon atoms;

liquid crystal component B:
at least one compound selected from compounds expressed by the formula

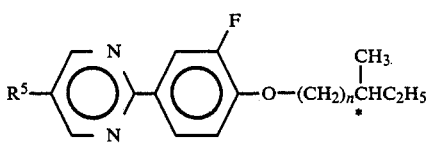

wherein $R^5$ represents an alkyl group of 1 to 18 carbon atoms; n represents an integer of 0 to 10; and * indicates an asymmetric carbon atom; and liquid crystal component C:
at least one compound selected from compounds expressed by the formula

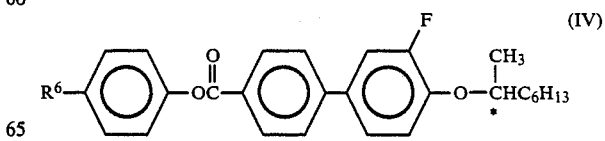

wherein $R^6$ represents an alkyl group or an alkoxy group each of 1 to 18 carbon atoms and * indicates an asymmetric carbon atom and compounds expressed by the formula

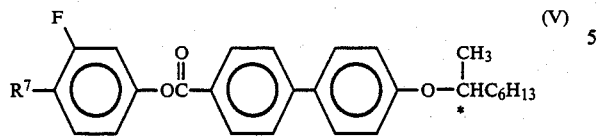

(V)

wherein $R^7$ represents an alkyl group or an alkoxy group each of 1 to 18 carbon atoms and * indicates an asymmetric carbon atom.

BRIEF DESCRIPTION OF THE DRAWINGS

FIG. 1 shows a chart illustrating the concentration dependencies of the response time of the respective mixture systems of a ferroelectric liquid crystal composition A of the present invention with a smectic base composition B, the proportions of A to B being varied.

DETAILED DESCRIPTION OF PREFERRED EMBODIMENTS

Figure 2:
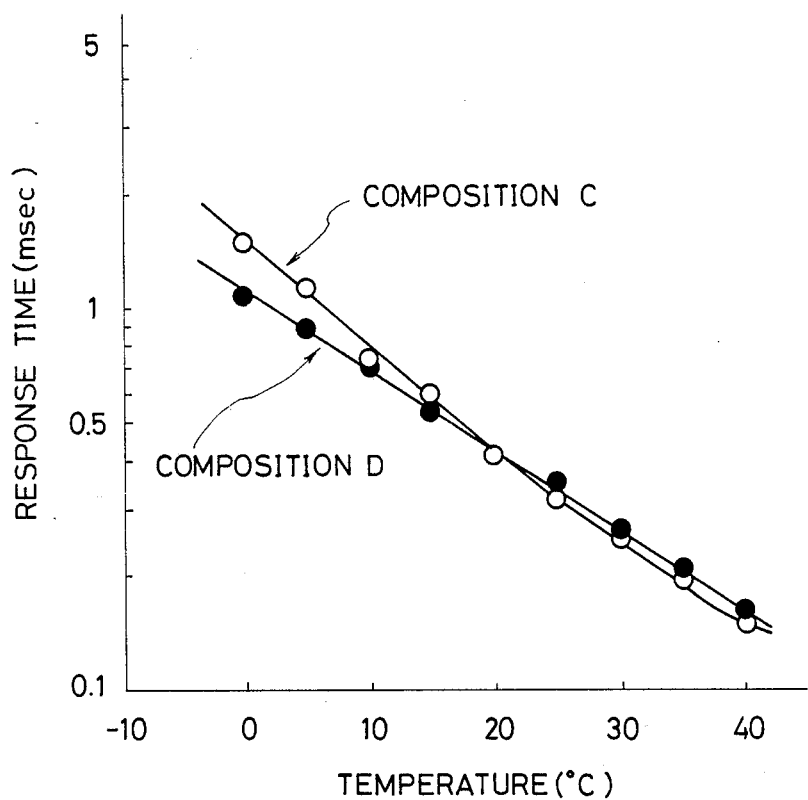
FIG. 2 shows a chart illustrating the respective temperature dependencies of the response time of ferroelectric liquid crystal compositions C and D.

The compounds of the formulas (I) and (II) constituting the above component (A) used in the present invention are achiral compounds, but have $S_c$ phase or the like and also have a very low viscosity; hence they are very useful as a smectic base mixture. The usefulness of the compounds has already been described by the present inventors in Japanese patent application laid-open No. Sho 61-291679/1986, and the compounds are also very effective as a component of the ferroelectric liquid crystal composition aimed in the present invention.

Similarly, the compound of the formula (III) costituting the component (B) is a halogen-containing heterocyclic compound previously applied for patent, the invention having been made by the present inventors (Japanese patent application No. Sho 61-10578/1986). The spontaneous polarization value of the compound is not so large, but the compound has Sc* phase within a very low temperature range; hence it is useful as a base liquid crystal compound for low temperatures. Further, as will be described later, it has been found by the present inventors for the first time that the compound also has an effect of reducing the temperature dependency of the response time of ferroelectric liquid crystal compositions.

Similarly, the compounds of the formulas (IV) and (V) constituting the above component (C) are halogen-containing optically active liquid crystal compounds previously applied for patent, the invention having been made by the present inventors, and already laid open (Japanese patent applica&ion laid-open No. Sho 61-210056/1986) and has a very large spontaneous polarization value. Compounds having among the spontaneous polarization value (abbreviated to Ps), the viscosity (abbreviated to $\eta$) and the response time (abbreviated to $\tau$) of ferroelectric liquid crystal materials, a relationship of $$\tau = \frac{\eta}{Ps \cdot E}$$

wherein E represents an intensity of electric field impressed to a liquid crystal cell, and having a low viscosity and also a large spontaneous polarization value have been desired. The compounds of the formulas (IV) and (V) constituting the component (C) play such a role in the ferroelectric liquid crystal composition. Further, it has also been found by the present inventors that these compounds also have an effect of reducing the temperature dependency of the response time of ferroelectric liquid crystal compositions.

The present inventors have examined the respective proportions of the components A, B and C in which proportions a liquid crystal composition having aimed superior specific features is obtained by making the best use of the respective specific features of the components A, B and C. As a result, as described above, the proportion of the component A is in the range of 10 to 70% by weight, that of the component B is in the range of 10 to 50% by weight and that of the component C is in the range of 10 to 40% by weight.

The present invention is based on a combination of the respective superior specific features of the liquid crystal compounds of the above formulas (I) to (V). The superior specific features of the respective liquid crystal components will be described below in more detail.

The compounds of the formulas (I) and (II) constituting the liquid crystal component A are both achiral compounds, but the compound of the formula (I) has Sc phase within a low temperature region (e.g. Cr 28 Sc 47 $S_A$ 58 N 66 $I_{so}$ in the case of the formula (I) wherein $R^1 = C_6H_{13}$— and $R^2 = C_8H_{17}$—), whereas the compound of the formula (II) has Sc phase within a high temperature region (e.g. Cr 58 Sc 134 $S_A$ 144 N 157 $I_{so}$ in the case of the formula (II) wherein $R^3 = C_7H_{15}$— and $R^4 = C_8H_{17}$—). Thus, by combining the compound of the formula (I) with that of the formula (II), a smectic base mixture having Sc phase over from a low temperature region to a high temperature region is obtained.

The superior specific features of the compound having this skeleton have already been described by the present inventors in Japanese patent application laid-open No. Sho 61-291679/1986, and since it has a very low viscosity, it also plays an important role as a smectic base mixture in the ferroelectric liquid crystal composition aimed in the present invention.

FIG. 1 shows the concentration dependency of the response time of a mixture system of a ferroelectric liquid crystal composition A (phase transition points: ~Sc* 55 $S_A$ 69N* 76 $I_{so}$) composed of chiral smectic liquid crystal compounds with a smectic base composition B (phase transition points: Cr 4 Sc 65 $S_A$79 N 90 $I_{so}$) composed of achiral liquid crystal compounds. The measured temperature is 25° C., the intensity of electric field is 5 V/μm and the proportions of the respective compositions are as follows:

Composition A

-continued

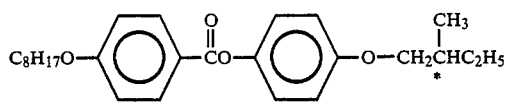
20 parts by weight

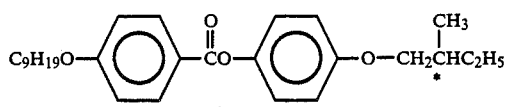
15 parts by weight

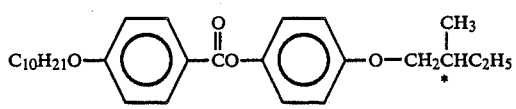
15 parts by weight

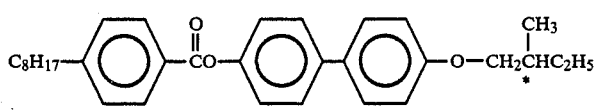
10 parts by weight

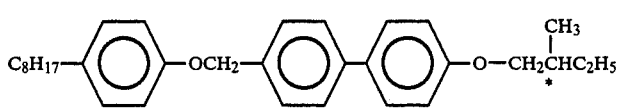
10 parts by weight

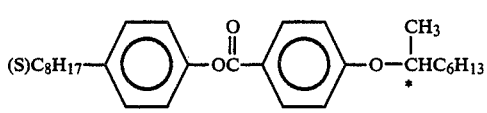
20 parts by weight

Composition B

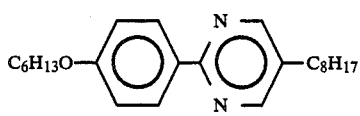
30% by weight

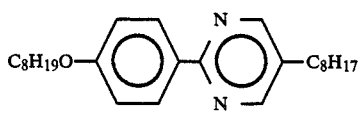
20% by weight

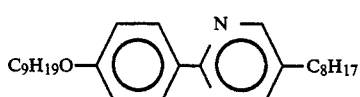
10% by weight

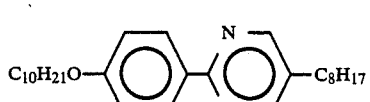
10% by weight

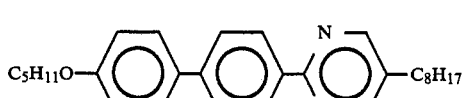
20% by weight

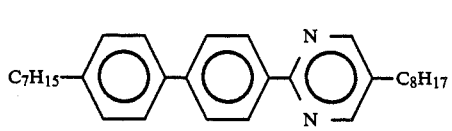
10% by weight

As seen from FIG. 1, as the composition B is added to the composition A, the response becomes faster, and the effectiveness of addition of the composition B is observed as far as 60% by weight in terms of the concentration of the composition B. However, beyond this concentration, the response time becomes slow; hence such higher concentrations are not practical. In view of the fact that the use object of the compounds of the component A consists in use as a smectic base compound, the concentration of the liquid crystal component A is preferred to be in the range of 70% by weight or less.

The compound of the formula (III) constituting the liquid crystal component B is a chiral compound and its spontaneous polarization value is not so large, but the compound has Sc* phase within a very low temperature region (e.g. Cr 7 Sc* 31 $S_A$ 33 $I_{So}$ in the case of the formula (III) wherein $R^5 = C_6H_{13}$— and n =5); hence the component B also plays an important role as a liquid crystal base compound like the liquid crystal base component A in the ferroelectric liquid crystal composition position aimed in the present invention.

The compound having this skeleton is a compound previously applied for patent, the inventors of the application being the present inventors (Japanese patent application No. Sho 61-10578/1986). As a result of various examinations made later, a surprising effect of the compound has been found by the present inventors for the first time.

FIG. 2 shows the respective temperature dependencies of the response time of the following ferroelectric liquid crystal compositions C and D:

Composition C consists of the above-mentioned smectic base composition B and a chiral smectic liquid crystal compound A shown below (phase transition points of the C: ~Sc* 62 Sc 74 N* 87 $I_{So}$).

Composition D consists of the smectic base composition position B, a chiral smectic liquid crystal compound A shown below and chiral smectic liquid crystal compounds B and C each of the formula (III) and shown below (phase transition points of the D: ~Sc* 53 $S_A$ 70 N* 75 $I_{So}$).

The intensity of electric field is 5 V/μm and the respective proportions of the compositions C and D are as follows:

40° C. i.e. the vicinity of room temperature to higher temperatures, whereas the response time of the composition D is faster than that of the composition C within a lower temperature region of 0° to 20° C. The ratio of the response time at 0° C. to that at 40° C. is about 10 in the case of the composition C, while it is about 6.9 in the case of the composition D, that is, the temperature dependency of the composition C is very small. The difference between the composition C and the composition D consists only in that a moiety (40% by weight) of the smectic base composition B (80% by weight) in the composition C is replaced by the compound B and the compound C each of the formula (III) in the composition D. Thus, the fact that the temperature dependency of the response time of the composition D is better than that of the composition C is considered to be affected by the compound B and the compound C. Namely, it is seen that use of the compound of the formula (III) affords a ferroelectric liquid crystal composition having a small temperature-dependency of the response time. Since the component B compound has Sc* phase within a very low temperature region, the upper limit temperature of Sc* phase lowers when the compound is used too much (for example, comparison of the upper limit temperature of Sc* of composition C with that of composition D); hence such excess quantity is undesirable. Thus, the concentration range of the liquid crystal component B in the ferroelectric liquid crystal composition aimed in the present invention is preferably 50% by weight or less.

The compounds of the formulas (IV) and (V) as the liquid crystal component C are chiral compounds previously applied for patent in Japan by the present applicants and already laid open (Japanese patent application laid-open No. Sho 61-210056/1986), which compounds Composition C:

Composition B (smectic base composition)     80 wt. %

     20 wt. %

(Compound A)

Composition D:

Composition B (smectic base composition)     40 wt. %

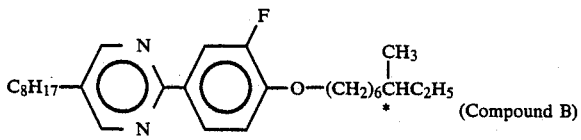     20 wt. %

(Compound B)

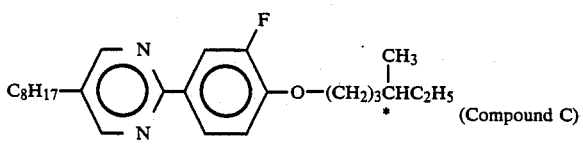     20 wt. %

(Compound C)

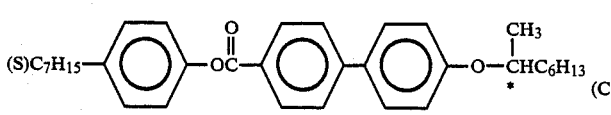     20 wt. %

(Compound A)

Figure 3:
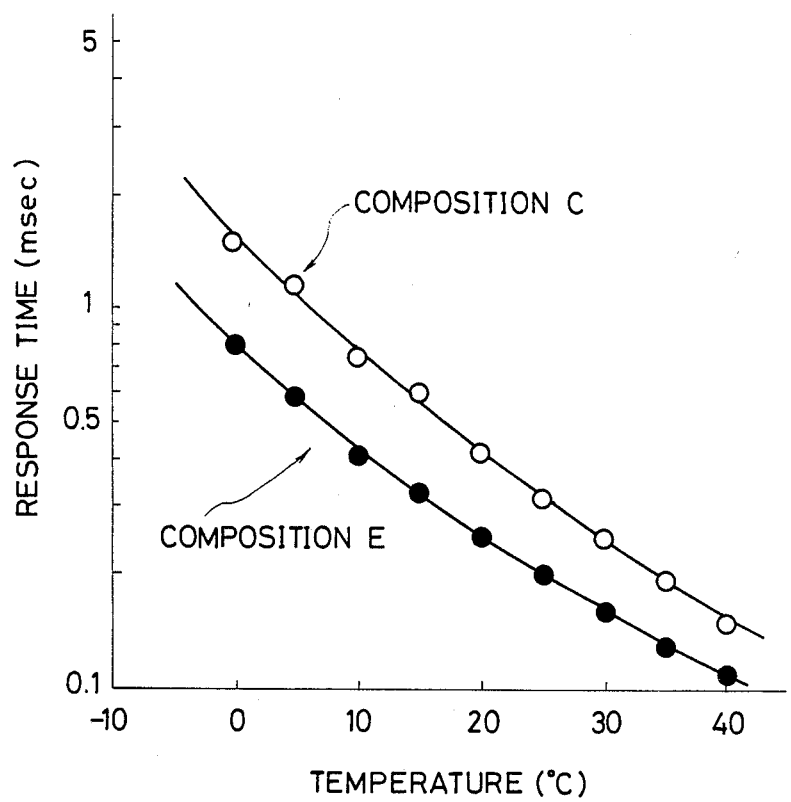
FIG. 3 shows a chart illustrating the respective temperature dependencies of the response time of ferroelectric liquid crystal compositions C and E.

As seen from FIG. 2, when the composition C is compared with the composition D, there is a tendency that the response times of the two compositions are to a similar extent within a temperature region of 20° C. to exhibit Sc* phase within a high temperature region and also have a very large spontaneous polarization value (for example, in the case of a compound of the formula (IV) wherein $R^6=C_8H_{17}O-$, the phase transition points: Cr 52 Sc* 104 N* 109 'I$_{so}$, Ps: 132 nC/cm$^2$ (T−Tc=−30° C.), and in the case of a compound of the formula (V) wherein $R^7=C_7H_{15}O-$, the phase transition points: Cr 69 Sc* 95 S$_A$ 106 I$_{so}$, Ps: 93 nC/cm$^2$ (T−Tc=−30° C.). Thus, the above compounds are important ones playing a role of developing high-speed response properties and also improving the upper limit temperature of Sc* phase of the composition in the ferroelectric liquid crystal composition aimed in the present invention. Further it has been found by the present inventors for the first time that these compounds have a surprising effect of reducing the temperature-dependency of the response time of ferroelectric liquid crystal compositions as in the case of the compound of the formula (III) as the liquid crystal component B. FIG. 3 shows a chart illustrating the respective temperature-dependencies of the response time in the above-mentioned ferroelectric liquid crystal composition C and a ferroelectric liquid crystal composition E (phase transition points: ∼Sc* 65 S$_A$ 74 N* 86 I$_{so}$) consisting of the above-mentioned smectic base composition B and a chiral smectic liquid crystal compound D which is a compound of the formula (IV). The intensity of the electric field is 5 V/μm. The proportions of the composition E are as follows:

| | |
|---|---|
| Composition B (smectic base composition) | 80% by weight |
| (S)C$_7$H$_{15}$—⬡—OC(O)—⬡—⬡(F)—O—CHC$_6$H$_{13}$(CH$_3$)* | 20% by weight |
| (Compound D) | |

Further, the spontaneous polarization value at 25° C. of the composition C was 2 nC/cm$^2$ and that of the composition E was 5 nC/cm$^2$. As apparent from FIG. 3, the response time of the composition E is faster than that of the composition C and the temperature-dependency of the composition E is also less than that of the composition C (the ratio of the response times at 0° C. and 40° C. is about 10 in the case of the composition C and about 7.3 in the case of the composition E). The difference between the composition C and the composition E corresponds to the difference between the chiral smectic compound A and the chiral smectic compound D, and it has been found that by using the compound of the formula (IV), a ferroelectric liquid crystal composition having high-speed response properties and yet a small temperature-dependency of response time is obtained. Further, as apparent from Example 7 mentioned later, the compound of the formula (V) also has the same effectiveness as that of the compound of the formula (IV); hence it is anticipated that by using the compounds of the formula (IV) and the formula (V), a ferroelectric liquid crystal composition having a small temperature-dependency of response time may be obtained. Taking into account the respective concentration ranges of the liquid crystal component A and the liquid crystal component B, and also in view of the usefulness of the liquid crystal component C, the concentration range of the liquid crystal component C in the ferroelectric liquid crystal composition aimed in the present invention is preferred to be 40% by weight or less.

The respective proportions of the liquid crystal components A, B and C in which proportions a ferroelectric liquid crystal composition having superior specific features, aimed in the present invention is obtained making the best use of the respective specific features of these components as described above are as follows:
liquid crystal component A: 10 to 70% by weight,
liquid crystal component B: 10 to 50% by weight, and
liquid crystal component C: 10 to 40% by weight.

Next, the foregoing will be described by way of examples.

A ferroelectric liquid crystal composition F consisting of Sc compounds as the liquid crystal component A of the present invention and known chiral smectic liquid crystal compounds and having the following proportions was prepared:

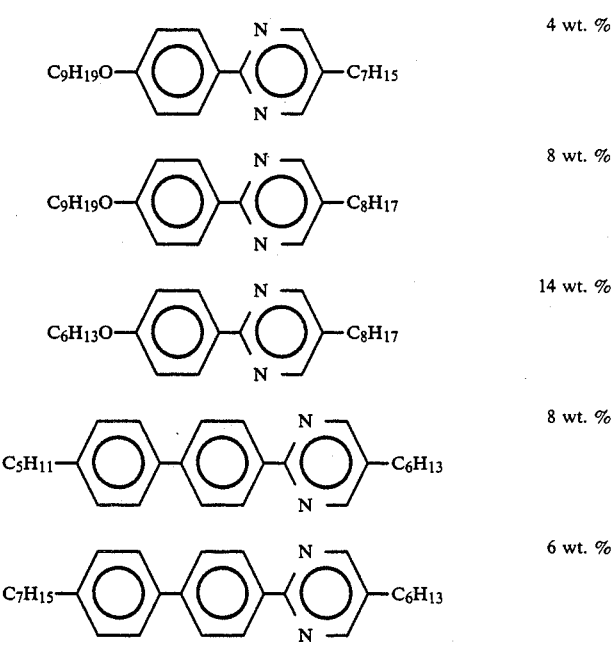

-continued

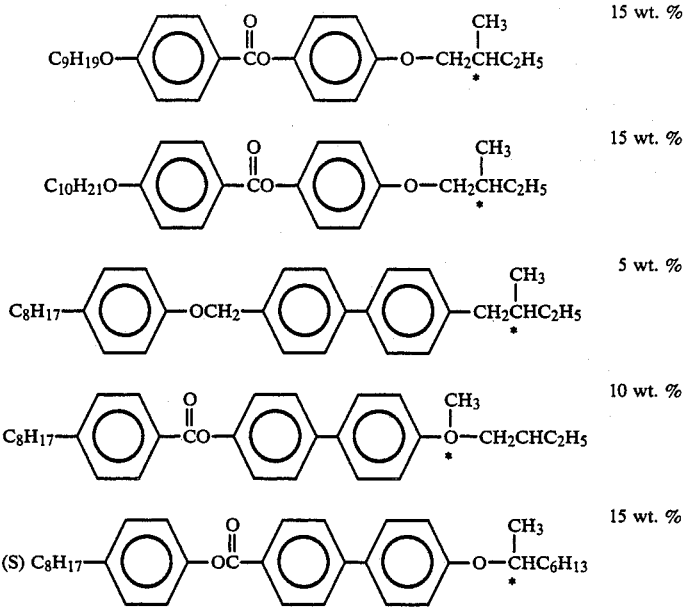

15 wt. %

15 wt. %

5 wt. %

10 wt. %

15 wt. %

The phase transition points of this composition were as follows:

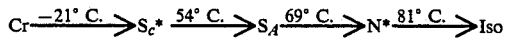

The Ps at 25° C. was 4.7 nC/cm², the tilt angle was 21° and the length of the helical pitch of Sc* phase was 5 μm.

This liquid crystal composition F was filled in a cell of 2 μm thick provided with electrodes subjected to aligning treatment and a square wave of peak to peak (hereinafter abbreviated to $V_{pp}$) of 20 V and 100 Hz was impressed to measure the response time. As a result, the time was 350μ sec at 25° C. Further, the response time at 0° C. and 40° C. were 2m sec and 200μ sec, respectively, and the ratio of the response times at 0° C. and 40° C. was 10.

Further, a ferroelectric liquid crystal composition G consisting of Sc compounds as the liquid crystal component A and known chiral smectic liquid crystal compounds and having the following proportions was prepared:

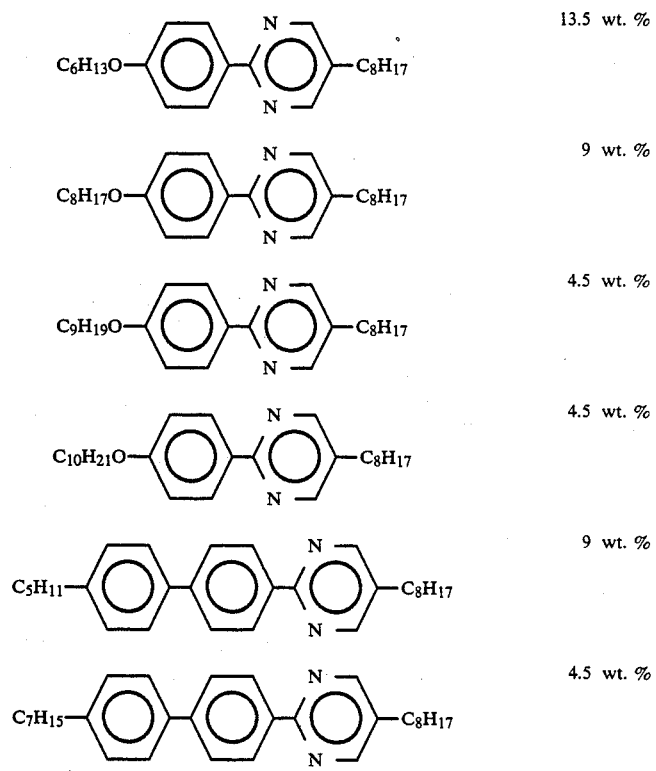

13.5 wt. %

9 wt. %

4.5 wt. %

4.5 wt. %

9 wt. %

4.5 wt. %

-continued

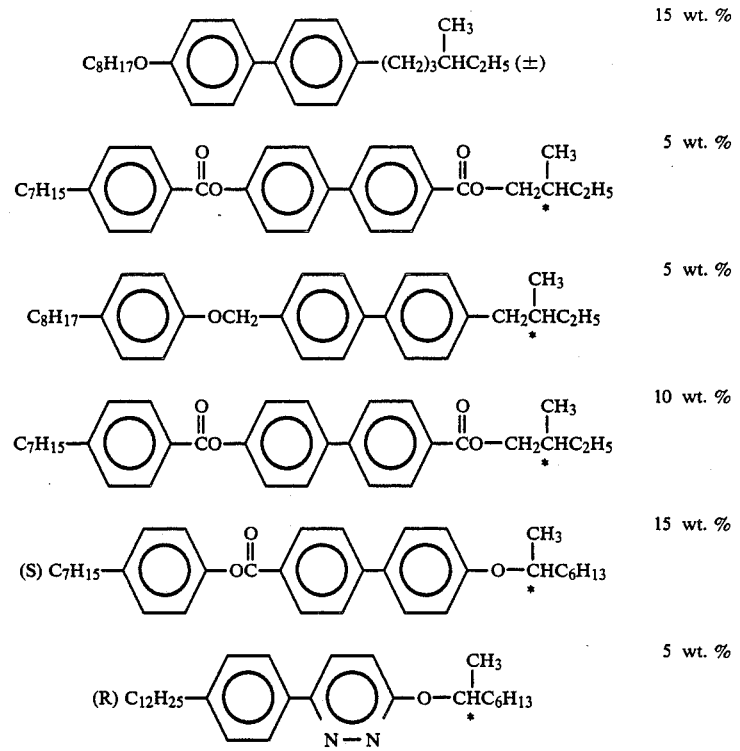

15 wt. %

5 wt. %

5 wt. %

10 wt. %

15 wt. %

5 wt. %

The phase transition points of this composition G were as follows:

The Ps at 25° C. was 5.9 nC/cm², the tilt angle was 24° and the length of the helical pitch of Sc* phase was 3 μm.

This liquid crystal composition G was filled in the same cell as in the case of the composition F and the response time was measured to give 230 μ at 25° C. Further, the response times at 0° C. and 40° C. were 1.9μsec and 130μ sec, respectively and the ratio of the response times at 0° C. and 40° C. was 14.6.

On the other hand, a ferroelectric liquid crystal composition H comprising the liquid crystal components A, B and C of the present invention as shown below was prepared:

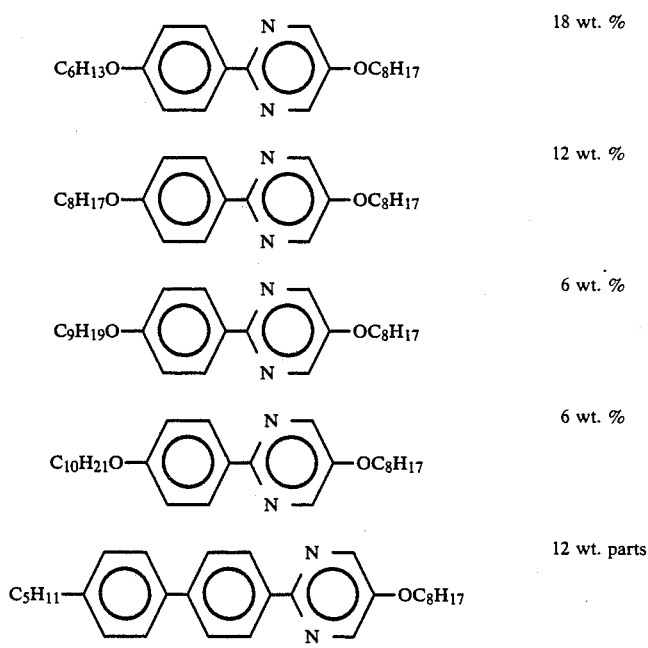

18 wt. %

12 wt. %

6 wt. %

6 wt. %

12 wt. parts

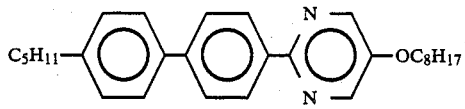

12 wt. parts

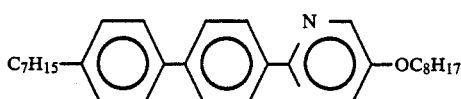

6 wt. parts

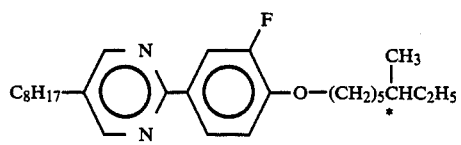

20 wt. parts

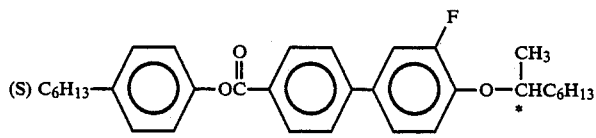

20 wt. parts

The phase transition points of this composition H were as follows:

The Ps at 25° C. was 8 nC/cm², the tilt angle was 24° and the length of the helical pitch of Sc* phase was 3 μm.

This liquid crystal composition H was filled in the same cell as in the case of the above composition F and the response time was measured to give 150μ sec at 25° C. Further, the response times at 0° C. and 40° C. were 600μ sec and 80μ sec, respectively, and the ratio of the response times at 0° C. and 40° C. was 7.5.

As apparent from the foregoing, the ferroelectric liquid crystal composition comprising the liquid crystal components A, B and C of the present invention has far superior high-speed response properties and a small temperature-dependency of response time.

Examples 1 to 11

The present invention will be described in more detail by way of Examples, but it should not be construed to be limited thereto.

In addition, the spontaneous polarization value (Ps) was measured according to Sawyer-Tower method, and the helical pitch (P) was sought by using a cell of about 200 μm thick subjected to homogeneous alignment and directly measuring the distance between dechiralization lines corresponding to the helical pitch under a polarizing microscope. The tilt angle (θ) was sought by impressing a sufficiently high electric field higher than the critical electric field to a cell subjected to homogeneous alingment to make the helical structure extinct, followed by inverting its polarity and observing the angle (corresponding to 2θ) at which the extinction position was transferred, under crossed nicols.

The response time was sought by filling the respective compositions in a cell subjected to aligning treatment and having a distance between electrodes of 2 μm, impressing a square wave of $V_{pp}$ of 20 V and 100 Hz and observing the change in the intensity of transmitted light at that time.

In addition, the compositions of Examples include those containing a chiral compound for extending the pitch of Sc* phase besides the above-mentioned respective components A, B and C, but such chiral compound does not damage the specific features of the ferroelectric liquid crystal composition aimed in the present invention; hence no problem is raised.

Table 1 shows the component proportions of the ferroelectric liquid crystal compositions of the present invention in Examples 1 to 11 and Table 2 shows the values of their specific features. Further, the respective proportions in Table 1 are of percentage by weight.

TABLE 1

| Component | Formula | Compound | Example No. | | | | | | | | | | |
|---|---|---|---|---|---|---|---|---|---|---|---|---|---|
| | | | 1 | 2 | 3 | 4 | 5 | 6 | 7 | 8 | 9 | 10 | 11 |
| A | I | C₆H₁₃O—⟨⟩—⟨N◯N⟩—C₈H₁₇ | 18 | 17.5 | 17.5 | 19.3 | 19.3 | 17.5 | 17.5 | 18 | 18 | 18 | 15 |
| | I | C₈H₁₇O—⟨⟩—⟨N◯N⟩—C₈H₁₇ | 12 | | | | | | | 12 | 15 | 12 | 10 |
| | I | C₉H₁₉O—⟨⟩—⟨N◯N⟩—C₇H₁₅ | | | 5 | 5.5 | 5.5 | 5 | 5 | | | | |
| | I | C₉H₁₉O—⟨⟩—⟨N◯N⟩—C₈H₁₇ | 6 | 10 | 10 | 11 | 11 | 10 | 10 | | | | |
| | I | C₁₀H₂₁O—⟨⟩—⟨N◯N⟩—C₈H₁₇ | 6 | | | | | | | 6 | 6 | 6 | 5 |
| | II | C₅H₁₁—⟨⟩—⟨⟩—⟨N◯N⟩—C₆H₁₃ | 12 | | | | | 10 | 10 | 12 | 10 | 10 | 10 |
| | II | C₅H₁₁—⟨⟩—⟨⟩—⟨N◯N⟩—C₈H₁₇ | | | 5 | | | | | 12 | 15 | 12 | 10 |
| | II | C₇H₁₅—⟨⟩—⟨⟩—⟨N◯N⟩—C₆H₁₃ | | 7.5 | 7.5 | 8.2 | 8.2 | 7.5 | 7.5 | | | | |

TABLE 1-continued

| Component | Formula | Compound | 1 | 2 | 3 | 4 | 5 | 6 | 7 | 8 | 9 | 10 | 11 |
|---|---|---|---|---|---|---|---|---|---|---|---|---|---|
| B | II | C$_7$H$_{15}$—⌬—⌬—Py(N)—C$_8$H$_{17}$ | 6 | | | | | | | 6 | | 6 | 5 |
| | III | C$_8$H$_{17}$—Py(N,N)—⌬(F)—O—(CH$_2$)$_3$CH(CH$_3$)C$_2$H$_5$* | 5 | 10 | 10 | 15 | 15 | 15 | | 10 | 20 | 10 | 15 |
| | III | C$_8$H$_{17}$—Py(N,N)—⌬(F)—O—(CH$_2$)$_4$CH(CH$_3$)C$_2$H$_5$* | 5 | 10 | 10 | 10 | 5 | 10 | 5 | 5 | | | |
| | III | C$_8$H$_{17}$—Py(N,N)—⌬(F)—O—(CH$_2$)$_5$CH(CH$_3$)C$_2$H$_5$* | 10 | 15 | 15 | 15 | 15 | 15 | 20 | | | | |
| | III | C$_8$H$_{17}$—Py(N,N)—⌬(F)—O—(CH$_2$)$_6$CH(CH$_3$)C$_2$H$_5$* | 20 | 15 | 15 | 20 | 20 | 20 | | | 20 | | |
| C | IV | (S)C$_6$H$_{13}$—⌬—⌬—COO—⌬(F)—OCH(CH$_3$)C$_6$H$_{13}$* | | | 5 | | | | 5 | | | 5 | 5 |
| | IV | (S)C$_7$H$_{13}$—⌬—⌬—COO—⌬(F)—OCH(CH$_3$)C$_6$H$_{13}$* | | | | | | | | 20 | 20 | | |

TABLE 1-continued

| Component | Formula | Compound | Example No. | | | | | | | | | | |
|---|---|---|---|---|---|---|---|---|---|---|---|---|---|
| | | | 1 | 2 | 3 | 4 | 5 | 6 | 7 | 8 | 9 | 10 | 11 |
| | IV | F–C$_6$H$_4$–C$_6$H$_4$–OC(O)–C$_6$H$_4$–C$_6$H$_3$(F)–OCH(CH$_3$)C$_6$H$_{13}$ (S)C$_8$H$_{17}$ | | 10 | | | | | | | | | |
| | V | (S)C$_6$H$_{13}$–C$_6$H$_3$(F)–OC(O)–C$_6$H$_4$–C$_6$H$_4$–OCH(CH$_3$)C$_6$H$_{13}$ | | | | | | | 15 | | | | |
| Others | | (R)C$_{12}$H$_{25}$–C$_6$H$_4$–C$_6$H$_4$(N=N)–O–CH(CH$_3$)C$_6$H$_{13}$ | | | | | 5 | 5 | 5 | 5 | | 5 | |
| | | C$_8$H$_{17}$–C$_6$H$_4$–OCH$_2$–C$_6$H$_4$–C$_6$H$_4$–CH$_2$CH(CH$_3$)CH$_2$C$_2$H$_5$ | | | | | | | | | | 20 | 15 |

TABLE 2

| Specific features | 1 | 2 | 3 | 4 | 5 | 6 | 7 | 8 | 9 | 10 | 11 |
|---|---|---|---|---|---|---|---|---|---|---|---|
| Phase transition points (°C.) | | | | | | | | | | | |
| $C_r \to S_C*$ | −6 | −22 | −17 | −18 | −20 | −21 | −20 | −5 | −10 | −7 | −9 |
| $S_C* \to S_A$ | 56 | 54 | 57 | 55 | 58 | 56 | 55 | 53 | 55 | 51 | 55 |
| $S_A \to N*$ | 70 | 67 | 70 | 67 | 69 | 68 | 64 | 65 | 72 | 67 | 72 |
| $N* \to I_{SO}$ | 74 | 72 | 77 | 74 | 76 | 73 | 68 | 71 | 75 | 74 | 78 |
| Ps* (μm) | 8 | 12 | 8 | 9 | 8 | 9 | 9 | 7 | 9 | 9 | 4 |
| Tilt angle* (°) | 25 | 24 | 25 | 25 | 25 | 24 | 26 | 21 | 25 | 21 | 21 |
| Helical pitch* (μm) | 2 | 3 | 3 | 2 | 4 | 5 | 2 | 2 | 3 | 2 | 2 |
| Response time (μsec) | | | | | | | | | | | |
| 40° C. | 100 | 100 | 100 | 125 | 100 | 100 | 130 | 125 | 130 | 130 | 200 |
| 25° C. | 160 | 150 | 175 | 170 | 150 | 150 | 170 | 175 | 220 | 200 | 350 |
| 0° C. | 750 | 700 | 750 | 900 | 750 | 700 | 900 | 900 | 800 | 900 | 1400 |
| Temp. dependency of response time 40~0° C. | 7.5 | 7 | 7.5 | 7.2 | 7.5 | 7 | 6.9 | 7.2 | 6.2 | 6.9 | 7 |

(Note)
*value at 25° C.

What we claimed is:

1. A ferroelectric liquid crystal composition comprising the following three liquid crystal components A, B and C, the respective proportions of the components A, B and C being 10 to 70% by weight, 10 to 50% by weight and 10 to 40% by weight based on the total weight of these components, respectively:

liquid crystal component A:
at least one compound selected from compounds expressed by the formula

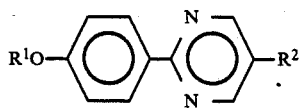
(I)

wherein $R^1$ and $R^2$ represent the same or different alkyl group of 1 to 18 carbon atoms and compounds expressed by the formula

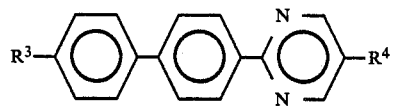
(II)

wherein $R^3$ and $R^4$ represent the same or different alkyl group or alkoxy group each of 1 to 18 carbon atoms;

liquid crystal component B:
at least one compound selected from compounds expressed by the formula

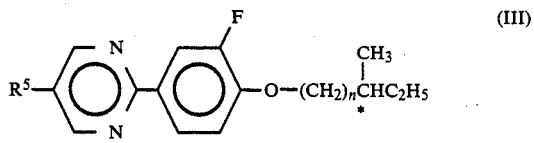
(III)

wherein $R^5$ represents an alkyl group of 1 to 18 carbon atoms; n represents an integer of 0 to 10; and * indicates an asymmetric carbon atom; and liquid crystal component C:
at least one compound selected from compounds expressed by the formula

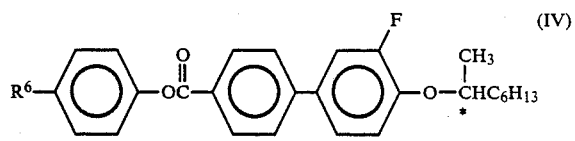
(IV)

wherein $R^6$ represents an alkyl group or an alkoxy group each of 1 to 18 carbon atoms and * indicates an asymmetric carbon atom and compounds expressed by the formula

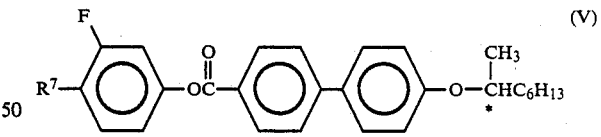
(V)

wherein $R^7$ represents an alkyl group or an alkoxy group each of 1 to 18 carbon atoms and * indicates an asymmetric carbon atom.

2. A light switching element containing a ferroelectric liquid crystal composition as set forth in claim 1.

* * * * *